United States Patent [19]
Bochory

[11] 3,881,753
[45] May 6, 1975

[54] FASTENER MECHANISM
[76] Inventor: Michael E. Bochory, 5000 Centinela Ave., Los Angeles, Calif. 90066
[22] Filed: June 4, 1973
[21] Appl. No.: 366,299

[52] U.S. Cl. ................................................ 285/92
[51] Int. Cl. ........................................... F16j 15/00
[58] Field of Search ....................................... 285/92

[56] References Cited
UNITED STATES PATENTS
1,385,178    7/1921    Levedahl ............................. 285/92

FOREIGN PATENTS OR APPLICATIONS
319,710    9/1929    United Kingdom ................... 285/92

*Primary Examiner*—Patrick D. Lawson
*Attorney, Agent, or Firm*—Michael S. Striker

[57] ABSTRACT

Snap-on and snap-off fastener mechanism of a special shape and form, in combination with male and female members adaptively interconnected and secured against translational movement by spring means designed to withstand substantial loads.

10 Claims, 12 Drawing Figures

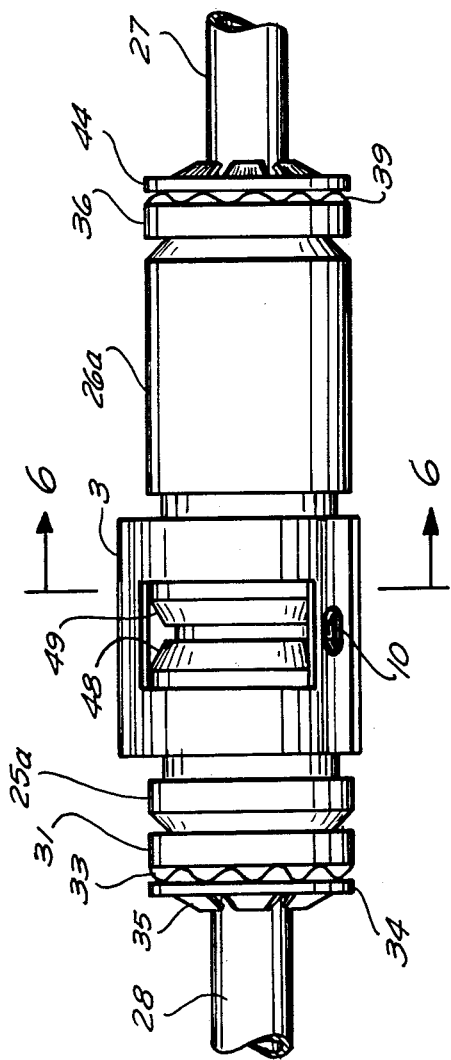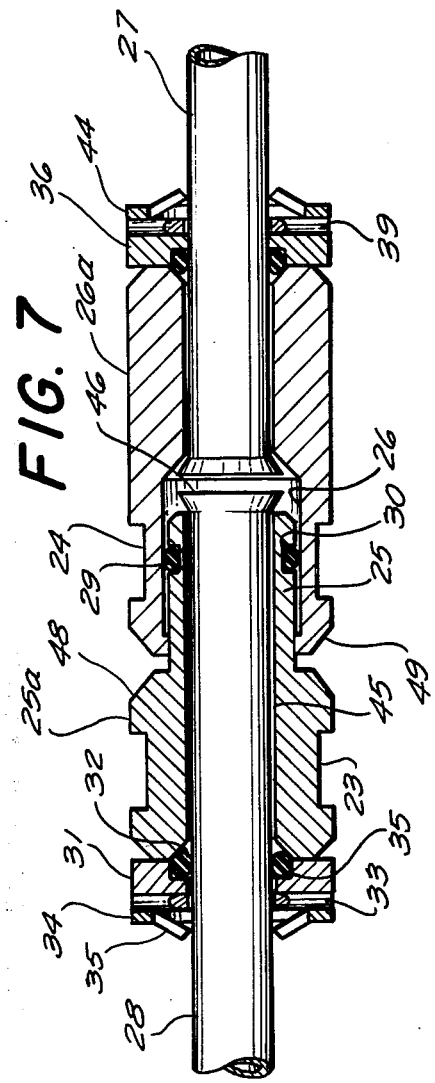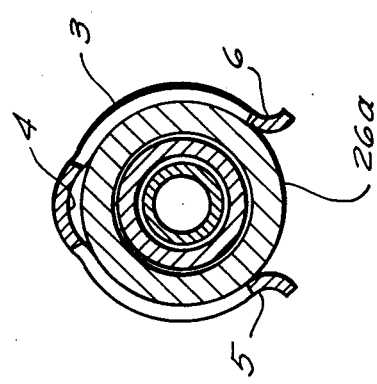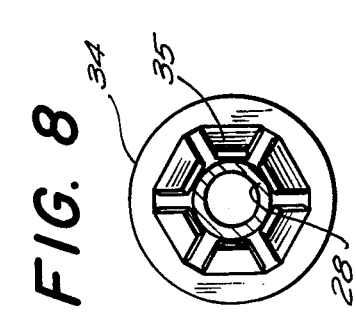

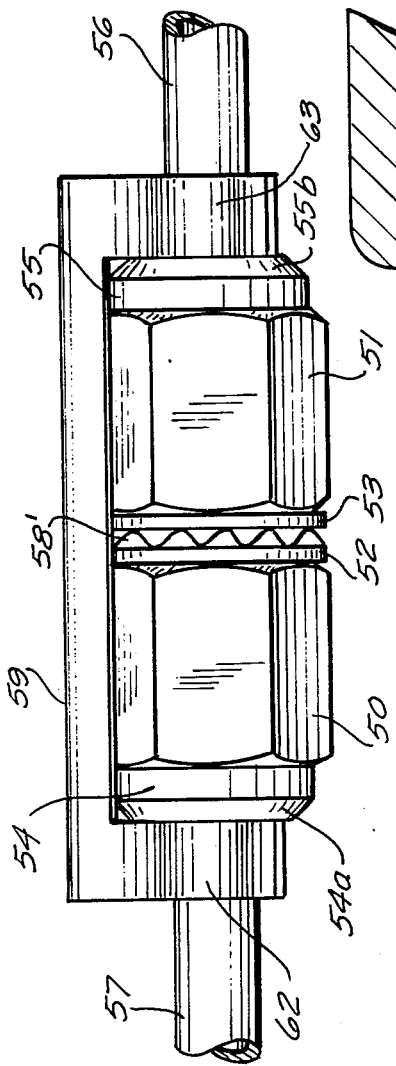
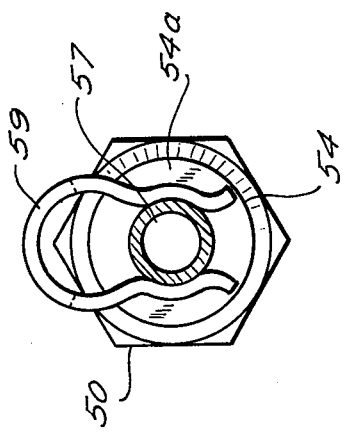
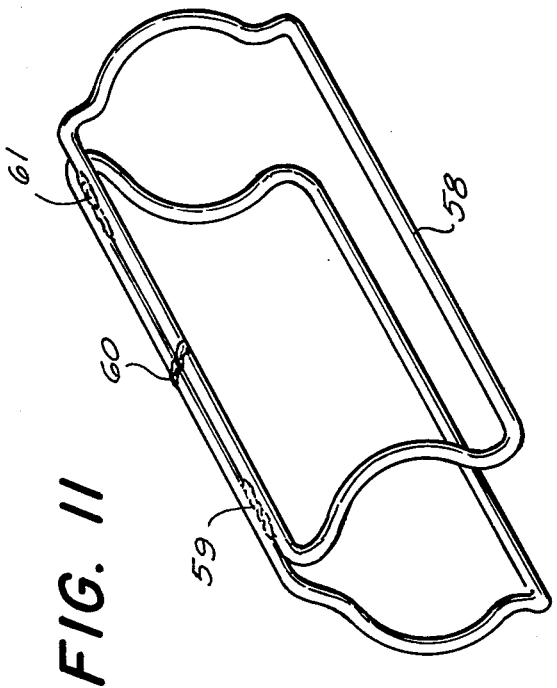

FASTENER MECHANISM

BACKGROUND OF THE INVENTION

The present invention relates to a fastening mechanism arrangement in general, and more particularly to a fastening arrangement for joining and locking together two or more component units. Still more particularly the present invention relates to such a fastening arrangement for joining or locking two or more component units without requiring the use of auxiliary parts such as nuts or bolts, and without the necessity of providing screw threads, ball locks, latches, cam locks of any type on the component unit which is to be locked together. It is well known in the field of connecting and coupling devices to connect various component elements by means of threaded members, ball locks, cam locks, wedges and wedging elements of any type.

All of the above described fastening means possess certain inherent difficulties and disadvantages; they unlock under vibration; they need special tooling for each size; it takes time to screw or unscrew; they are costlier to produce, and they need auxiliary means like; lock washers, special threads, bonding agents (locktite), cotter pins, or wiring so as to prevent accidental disconnection.

SUMMARY OF THE INVENTION

The present invention overcomes the disadvantages of the prior art as outlined above.

More particularly, the present invention provides a fastening arrangement for securing two or more component members to one another without any means for screw-threading or precision assembly.

The fastening arrangement in accordance with the present invention is simple to manufacture, stamping for example, and therefore is very economical by saving time in assembly; and it is highly reliable in operation.

The fastening arrangement in accordance with the present invention lends itself for being manufactured from a great variety of different materials.

A particular advantage of the present invention is that the fastening arrangement to which it appertains is suitable for many applications and that the novel fastening arrangement can be used for joining two or more members together with similar ease as for joining, for instance, two components of a low or high pressure coupling.

In accordance with one feature of my invention I provide a fastening arrangement which includes a first member having a bore, called the female, and a second member called the male, adapted to penetrate in sliding contact within the female bore, both members male and female secured against axial movement by a third member adapted to snap over them both.

In accordance with another feature of the present invention and more particularly where the connection is applicable for fluids the male and female members may comprise sealing means of a novel design adaptable to cooperate with this and-or other types of connections, described in the foregoing detailed description in which:

FIG. 5 shows a complete connection assembly adapted to conduct fluids.

FIG. 6 shows a cross section according to 6-6; it shows one end of the snap fastener in its groove.

FIG. 7 shows a longitudinal view with the snap fastener removed for clarity. This view shows the sealing method at the end of the connection.

FIG. 8 shows the type of grip washer or nut that may be adapted to preload the seal.

FIG. 9 shows a different shape and method of fastening and sealing. The fastener snaps over the tubing, it also preloads the sealing mechanism.

FIG. 10 shows the shape of the fastener shown in FIG. 9.

FIG. 11 shows a snap fastener made of round wire.

FIG. 12 shows a fastening mechanism between a male and female of different shapes. In this view the snap fastener has been removed for clarity.

Figure 1:
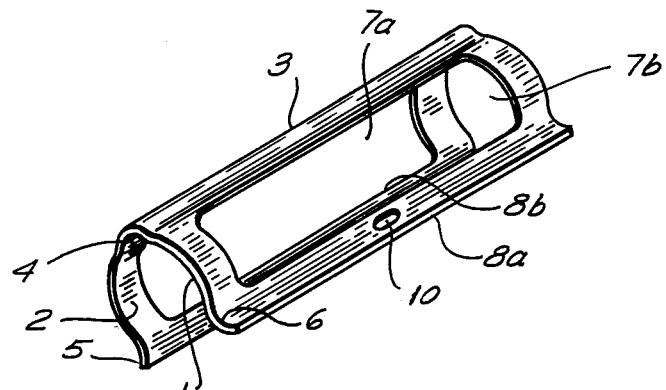
FIG. 1 shows the snap fastener mechanism in a perspective view.
Figure 2:
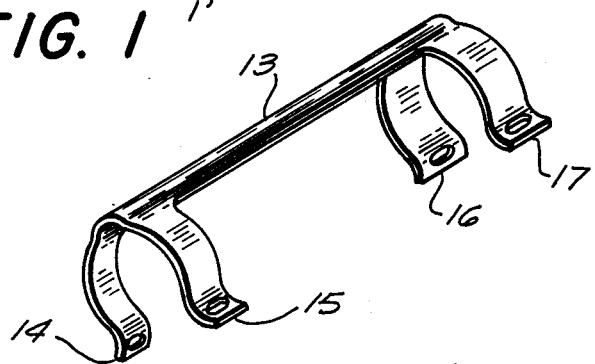
FIG. 2 shows an alternate design of the snap fastener mechanism.

Discussing now the drawing in detail, and firstly FIG. 1 thereof, it will be seen that my novel fastening device shown therein is used in this embodiment to couple and secure together two members, a male and a female, as exemplified in FIGS. 5, 7 and 12. Describing the fastener 3 of FIG. 1, we see that its shape is slightly oval as viewed from one end. When the fastener is assembled over the coupling 22, the contacting surfaces 1 and 2 which engage the groove 22a will deflect the fastener to take the shape shown in FIG. 3. At the top, the fastener has a curved section 4 overall its length; similarly the bottom ends of the fastener 5 and 6 are also slightly curved to permit assembly or disassembly. The openings 7a and 7b allows the contacting surfaces 1 and 2 provided at both ends of the fastener to penetrate into the grooves or shoulders 23 and 24 of the coupling as shown in FIG. 7. The top curved section or beam 4, as well as the bottom curved sections, or beams 8a and 8b, are considerably more resistant to bending, than for example if the section was flat. The bottom sections 8a and 8b are each provided with a central hole 10, which may be used for wiring the fastener against accidental snap-off. The fastener 3 of FIG. 1 and the fastener 11 of FIG. 4 have typical cross-sections, the top and bottom curved sections are the ones that have to withstand the axial loads; therefore their thicknesses or sectional areas are a function of the load. The fastener 13 of FIG. 2 is of a lighter structural strength and the axial load is taken by the top curved section-beam. Fastener 13 has a shape similar to the fastener 3; its legs 14, 15, 16, and 17 are each adapted to penetrate into the respective grooves 23, 24, 40, and 41 of the couplings shown in FIGS. 7 and 12. Each of the above legs is provided with a hole for wiring purposes against accidental disassembly.

Figure 4:
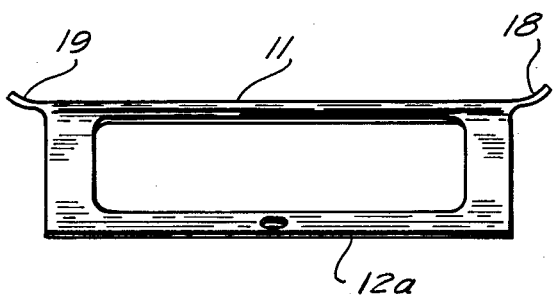
FIG. 4 shows a longitudinal view of the snap fastener mechanism, similar to FIG. 1, but provided with small tongues at the top for ease of disassembly with a screwdriver or other appropriate tool.

The fastener 11, shown in FIG. 4, may have tongues 18 and 19 for the purpose of inserting a screwdriver or adequate tool to remove the fastener from the coupling.

FIG. 5 shows the coupling and fastener mechanism fully assembled as adapted for the conduction of fluids.

Figure 3:
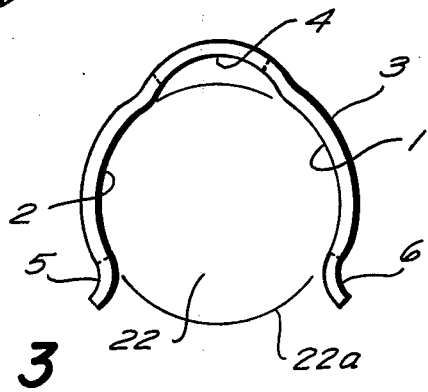
FIG. 3 shows a preferred cross-section of the snap fastener mechanism of circular shape when assembled; its original shape being slightly oval.

FIG. 7 shows the same coupling in cross-section allowing the viewer to see one example of the application. Now describing FIG. 7, the fastener mechanism comprises a male member 25, a female member 26 and a snap fastener shown in FIGS. 1, 2, 4, and 11. The male coupling 25 is shown inserted into a female coupling 26; and they are in sliding contact. Both the male and female have on their outer periphery grooves or shoulders 23 and 24 in which the snap fastener is held. At one end the male is provided with a circular groove 30, in which an O-ring 29 is held for sealing fluids between the male coupling and the female coupling. Each element will be described in order of assembly, beginning with a tubing 28, on which a grip washer 34 is inserted from left to right; otherwise, fingers 35 would grip into the tubing 28. From right to left, we assemble a spring-wave washer 33 and a washer 31 with a central capacity 35 able to receive an O-ring seal 32; and then the male member 25 is inserted and the tubing end 28 is swaged with conventional tools. One end of the male bore 45 is chamfered at an angle advantageous for the O-ring seal to wedge and seal fluid pressures between the tubing and the male. By hand or with a tool, the grip washer 34 is pushed from left to right, so that the above described parts slide on the tubing 28 until the parts bottom against the swaged end. The push force against the grip washer 34 should be such that the spring wave washer 33 is compressed; thereby forcing fingers 35 of the grip washer to self-energise and penetrate into the outer surface of the tubing 28. At this moment the O-ring seal 32 is wedged between the washer 31, the chamfer of the male, and the tubing. The same assembly procedure is used to assemble the female member 26 and its associated parts. The grip washer 44 is inserted from right to left on the tube 27. From left to right, we assemble the spring-wave washer 39, the washer 36, the O-ring seal 38, the female 26 then the tubing 27 will be swaged. The right hand end of the female bore is chamfered typically to the male chamber, so that under pressure the O-ring seal 38, is wedged between the tube, the female, and the capacity 37 of the washer 36; thereby sealing any fluid passage. By hand or with an appropriate tool, we apply a force against the grip washer 44, which in turn moves the elements mentioned above onto the tube 27, from right to left, until the female bore bottoms against the swaged end of the tube 27. The spring-wave washer 39 is compressed, and its reaction force preloads the O-ring Seal; and thereby holds the female against the swaged end. As I said before, the grip washer cannot move to the right, because its fingers have a self-energizing effect. The grip washer shown in FIG. 8 is of the type manufactured by PALNUT. This company makes also a hollow stamped nut forming its own threads when rotated; a similar type may also be used in combination with this sealing arrangement. Push nuts, grip washers and similar devices may hold loads up to 2000 lbs. and more if specially designed, therefore, they can withstand the pressures exercised against the seal. Both male and female members being assembled, we insert the male 25 into the female 26; thereupon, we force downward the snap fastener 3, so that it snaps over the coupling and into the grooves 23 and 24. The chamfers 48 and 49 allows the insertion of the male or the female in an axial mode. For example, one side of the fastener 3 is placed into the groove of the female 26; thereupon we insert the male 25, and as we advance it into the female bore, the chamfer 48 will deflect one end of the fastener 3 which later snaps into the groove 23, thus securing the coupling against axial movement. The same thing may be possible by using the fastener 13; 11; or 58 of FIG. 11. As shown in FIG. 7, when the coupling is assembled, and the fastener snapped over and into the grooves 23 and 24, there is always room between the male and female for adjustment purposes if, for example, the fastener 3 should be slightly shorter or longer. As shown in FIG. 3, when the fastener is snapped in its groove 22a of a coupling 22, it closely takes the shape of the groove.

Describing now the coupling of FIG. 9, this coupling comprises also a male and female similar in arrangement to FIG. 7 and provided with an O-ring groove, seal, and swaged tubings 56 and 57. On the male smaller diameter 50, there is inserted a washer 52, a spring-wave washer 58', and another washer 53. At the end of the male, there is a washer 55 comprising an O-ring seal; and at the end of the female, there is a washer 54 comprising an O-ring seal in a similar manner as shown in FIG. 7. The washers 54 and 55 are chamfered at 54a and 55b. The fastener 59 is of a different shape so that it snaps over the tubing 56 and 57; its shape is shown in FIG. 10. After the male has been inserted into the female by forcing the fastener 59 downward, as it comes into contact with the chamfered sides 54a and 55b, the washers 54 and 55, push the male 50 and the female 51, towards each other thereby compressing the spring-wave washer 58'. Ultimately the fastener snaps over the tubing 56 and 57. In this position, the coupling is secured from axial separation, and the seals are wedged between the male and its chamfered washer, and between the female and its chamfered washer; and therefore, no fluid passage is allowed between the tubing and washers.

The snap fastener 58, shown in FIG. 11, is of the type made out of round wire, and is either tack welded 59, 60, and 61, or secured by other means. FIG. 12 shows another type of connection in which the male 42 and the female 43 are dissimilar in shape. This connection as well as the couplings described above may use either types of fasteners 3, 13, 11 or 58. The snap fastener described above may be made of different materials and by many processes and it can be designed to withstand considerable separating loads by merely choosing the right shape and increasing the cross sectional area submitted to tension forces. Naturally a shape like the one described in FIG. 1, has a structural strength many times higher than the one described in FIG. 2, both being made of the same material and thickness.

It will be understood that each of the elements described above or two or more together, may also find a useful application in other types of fastening arrangements differing from the types described above.

While the invention has been illustrated and described as embodied in a fastening arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the invention.

What is claimed as new and desired to be protected by letters Patent is set forth in the appended claims:

1. A fastener assembly for joining pipe ends, comprising a female member adapted to accommodate one pipe end, a male member adapted to accommodate another pipe end and insertable into said female member; at least two axially spaced abutment means respectively provided on said female and male members; and springy retaining means adapted to be snapped onto said members in contact with said abutment means, so as to prevent axial separation of said male and female members.

2. A fastener assembly as defined in claim 1, wherein said male member is adapted to be in frictional sliding engagement with said female member when inserted therein.

3. A fastener assembly as defined in claim 1, wherein said retaining means comprises openings into which the respective abutment means enter when said retaining means is snapped onto said members.

4. A fastener assembly as defined in claim 2, wherein said springy retaining means snaps into a shape conforming to the shape of said abutment means.

5. A fastener assembly as defined in claim 4, wherein said shape of said springy retaining means is substantially circular when snapped in contact with said abutment means.

6. A fastener assembly as defined in claim 4, wherein said shape of said springy retaining means is substantially rectangular when snapped in contact with said abutment means.

7. A fastener assembly as defined in claim 1, wherein said springy retaining means comprises means for preventing said retaining means from snapping out of contact with said abutment means.

8. A fastener assembly as defined in claim 1; and further comprising sealing means provided on said male and female members to prevent fluid leakage.

9. A fastener assembly as defined in claim 1; and further comprising securing means including biasing means which urges said male and female members against their respectively associated pipe ends, so as to prevent axial separation of said members with respect to said respectively associated pipe ends.

10. A fastener assembly as defined in claim 1, wherein said female member is screwed onto said one pipe end; and wherein said male member is screwed onto said other pipe end.

* * * * *